UNITED STATES PATENT OFFICE.

WILLIAM SIEGMANN, OF BALTIMORE, MARYLAND, ASSIGNOR TO MARY V. GAULT, OF BALTIMORE, MARYLAND.

PROCESS OF MAKING MAGNESIUM CEMENT.

1,102,358. Specification of Letters Patent. Patented July 7, 1914.

No Drawing. Application filed April 7, 1911. Serial No. 619,514.

*To all whom it may concern:*

Be it known that I, WILLIAM SIEGMANN, a subject of the Emperor of Germany, residing at Baltimore city, State of Maryland, have invented new and useful Improvements in Processes of Making Magnesium Cement, of which the following is a specification.

This invention relates to an improved composition of matter.

The invention has for its object the production of a composition which is fire proof, water proof, acid proof, and also a non-conductor of electricity.

A further object is to produce a composition of matter which may be molded or otherwise shaped to form various articles of manufacture.

A further object is to form a composition of matter in powdered form which may be used in combination with moisture to form a plastic material for building or other purposes.

The invention will be hereinafter fully set forth and particularly pointed out in the claims.

In carrying out my invention I form a dry, substantially non-hygroscopic powder composed of a mixture of magnesium oxid, or equivalent oxid, sulfate of magnesia, common salt or sodium chlorid and kieselguhr. The composition thus obtained is ready for use by merely adding sufficient water and carbon bisulfid to produce a plastic composition which can be molded into any desired shape or which may be applied in its plastic state to walls or other parts of a building. In order to render the salt non-hygroscopic the water of crystallization is first removed after which the salt is powdered. It is well known that oxid of magnesium and the sulfate of magnesium will not combine in the absence of some ingredient which will combine with them to form a chlorid. The effect of the salt upon the powdered mixture when moistened by water is to accomplish this result by causing the oxid to combine with the magnesium oxid to form magnesium chlorid which in turn combines with the magnesium sulfate, thus forming a plastic mixture which will harden into a homogeneous mass. The carbon bisulfid increases the set and consequently the hardness of the composition. Experiment has demonstrated that if the composition is mixed with water alone considerable time is required for setting. The carbon bisulfid when added to the mixture, will rapidly evaporate and consequently increase the setting. It will also partly reduce some of the chlorid owing to the combination of the latter with the silica in the kieselguhr. The kieselguhr has well known neutral properties and serves as a filler, and experiments and tests have demonstrated that because of the very high percentage of silica contained in the kieselguhr the product produced is fire proof, water proof, acid proof, and also a non-conductor of electricity. It will be noted in this connection that while I have specified the oxid of magnesium I do not limit myself thereto as the oxid of zinc, oxid of calcium, oxid of alumina, and other equivalent oxids may be substituted for the oxid of magnesium without departing from the spirit of my invention. It will also be noted that various other sulfates may be substituted for the sulfate of magnesia without departing from my invention, as the latter contemplates any admixture in which the gradual production of oxy-chlorid of magnesium is accomplished.

If it is desired to modify the set by retarding the formation of the chlorid, calcined gypsum, boric acid, powdered borax, or other equivalent ingredient may be added. If it is desired to vary the hardness of the compositoin to secure pliability, asbestos, in any suitable form may be combined with the kieselguhr as a filler. I have also found that colophonium used as a filler in combination with the kieselguhr, either with or without the asbestos forms a material that may be readily cut and shaped for various uses. It is also obvious that coloring matter may also be introduced or not as desired.

A suitable composition made in accordance with my invention may be produced by mixing,

| | |
|---|---|
| Magnesium sulfate | 2 lbs. |
| Magnesium oxid | 4 lbs. |
| Sodium chlorid | ¼ lb. |
| Kieselguhr | 10 lbs. |
| Asbestos | 2 lbs. |
| Colophonium | 1 lb. |

Water and carbon bisulfid in equal proportions are added in sufficient quantities to form a plastic compound. It will be understood however, that I do not desire to limit myself to the foregoing proportions as the same may be varied according to the character of the material to be produced. The colophonium is preferably introduced in a ground or powdered state. It can be introduced, however, in a liquid state, in which event the same is dissolved in carbon-bisulfid.

From the foregoing it will be seen that my improved composition of matter may be made up in the form of a powder which may be shipped and handled as such and afterward mixed with water or carbon-bisulfid, or both to form a plastic material which is adapted for building material, pavements, and all inside and outside work. When the said powder is mixed with carbon-bisulfid alone the latter will act as a quick and excellent dissolver for sodium chlorid and magnesium sulfate as well as colophonium. Or these ingredients may be combined and molded into any desired shape for such use as may be found convenient. It is also obvious that the same will form a very hard substance, or the degree of hardness, elasticity and rigidity thereof may be varied by altering the proportions of the ingredients to produce material suitable to be operated upon by edge tools. The addition of the kieselguhr renders the composition highly neutral and produced many qualities that are highly desirable in the useful arts.

I claim as my invention:—

1. The herein described process for producing a composition consisting of mixing water, magnesium oxid, sodium chlorid, kieselguhr, asbestos and colophonium to produce a plastic compound and adding carbon bi-sulfid to increase evaporation of moisture and the dissolution of other ingredients.

2. The herein described process for producing a composition of matter consisting in commingling magnesium oxid, magnesium sulfate, common salt, kieselguhr, and adding water and carbon-bisulfid thereto.

3. The herein described process for producing a composition of matter consisting in mixing oxid of magnesium, sulfate of magnesium, asbestos, colophonium, kieselguhr and common salt and in mixing the same with water and carbon bi-sulfid.

In testimony whereof I have hereunto set my hand in presence of two subscribing witnesses.

WILLIAM SIEGMANN.

Witnesses:
    CHAS. E. RIORDON,
    LEWIS HODGES.